United States Patent [19]

Coburn et al.

[11] 4,017,251

[45] Apr. 12, 1977

[54] APPARATUS FOR PHYSICALLY CONDITIONING PLASTIC TAPE

[75] Inventors: Theodore Robert Coburn, Coventry; James Edward Kilcoyne, East Providence, both of R.I.

[73] Assignee: Marshall and Williams Company, Providence, R.I.

[22] Filed: June 4, 1976

[21] Appl. No.: 692,960

Related U.S. Application Data

[62] Division of Ser. No. 530,878, Dec. 9, 1974.

[52] U.S. Cl. .............................. 425/404; 425/297; 425/305 R; 425/308; 425/363

[51] Int. Cl.² .................. B29C 25/00; B29C 17/00; B29D 7/02; B29D 7/24

[58] Field of Search .......... 425/289, 296, 297, 305, 425/308, 363, 404, 445

[56] References Cited

UNITED STATES PATENTS

| | | | |
|---|---|---|---|
| 1,975,132 | 10/1934 | Van Derhoef | 425/445 X |
| 2,260,501 | 10/1941 | Wynd | 425/404 X |
| 3,283,378 | 11/1966 | Cramton | 425/404 X |
| 3,319,294 | 5/1967 | Borsvold et al. | 425/445 |
| 3,333,032 | 7/1967 | Dickinson | 425/404 X |
| 3,920,372 | 11/1975 | Katogi | 425/404 X |
| 3,927,927 | 12/1975 | Chill et al. | 425/445 X |

*Primary Examiner*—J. Howard Flint, Jr.
*Attorney, Agent, or Firm*—William Frederick Werner

[57] ABSTRACT

The invention comprises a process and apparatus for applying conductive heat to plastic film tapes in a stabilizing unit containing a plurality of rollers forming sets of rollers. Each roller in the set rotates progressively slower than the preceding adjacent roller. Some rollers have heated surfaces to reheat and heat soften the plastic film. Some rollers have cold surfaces to set the film. The progressively slower rotation of the rollers allows the film to release the stresses imparted to the film during the initial stretching operation. In so doing, the molecules rearrange themselves to provide an increased degree of tensile strength in the tapes. The reheating of the film causes shrinkage. However, the progressively slower rotation of adjacent rollers controls the degree of shrinkage and holds the shrinkage to a minimum.

2 Claims, 3 Drawing Figures

APPARATUS FOR PHYSICALLY CONDITIONING PLASTIC TAPE

This application is a division of patent application Ser. No. 530,878, filed Dec. 9, 1974.

STATEMENT OF INVENTION

This invention provides an in-line apparatus for the physical conditioning of plastic tape and more particularly to the apparatus for stabilizing plastic tape by reheating and thereby reducing reheating shrinkage to a minimum while imparting tensile strength.

BACKGROUND OF THE INVENTION

Jute for use as carpet backing thread is in short supply. Attempts have been made to provide plastic tape as a substitute for jute. In the prior art processes for making plastic tape, the processing speed was very slow, permitting stabilizing of the plastic tape in the heating ovens, through which the tape passed to be stretched longitudinally, to a desired thickness.

To make the plastic tape commercially saleable, the process for making the tape had to be speeded up to increase production and lower the cost of manufacture.

Production requirements increased but the ovens remained the same size, resulting in great shrinkage in the plastic tape during processing. Competition between plastic tape manufacturers has caused the manufacturers to look upon the shrinkage as a manufacturing loss.

The stabilizing operation was then performed in a unit separate from the in-line manufacturing process. The tapes were wound upon individual cores. The cores were subject to reheating to perform the stabilizing operation. The result was: first, the tapes wound on the cores shrank beyond allowable commercial limits; and, second, the degree of stability varied with the position of the layer of the tape upon the wound core; and, third, the extra handling increased the cost of manufacture of the tapes.

In the manufacture of plastic tape, a stabilizing operation is necessary to remove the stresses imparted into the tape during the longitudinal stretching operation. Stabilizing requires reheating of the tape. Reheating, heretofore, resulted in unsatisfactory shrinkage.

OBJECTS OF THE INVENTION

Accordingly, it is an object of the present invention to provide an in-line apparatus for the physical conditioning of plastic tape, including means for stabilizing the plastic tape.

Another object of the present invention is to provide apparatus for stabilizing plastic tape.

Still another object of the present invention is to provide apparatus to improve the heat transfer rates to the plastic tapes.

And still another object of the present invention is to provide means, whereby, reheat shrinkage of the plastic tape is held to a minimum.

Other objects of the present invention will be pointed out in part and become apparent in part in the following specification and claims.

BRIEF DESCRIPTION OF THE DRAWINGS

Referring to the drawings in which similar characters of reference indicate corresponding parts in all the figures.

DESCRIPTION OF THE PREFERRED EMBODIMENTS

Figure 1:
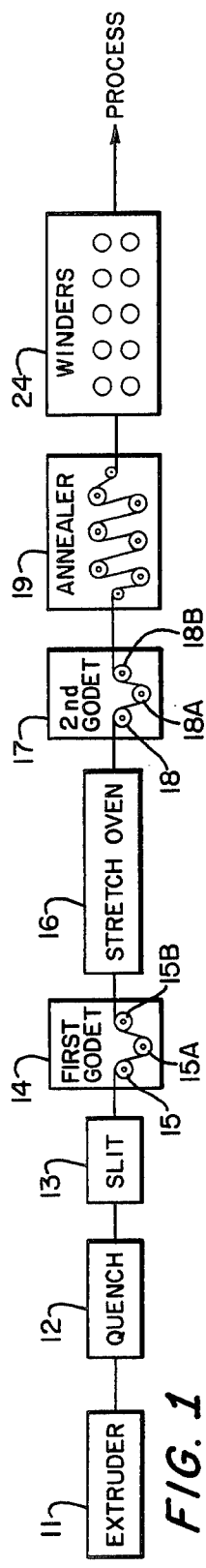
FIG. 1 is a diagrammatic view of an in-line apparatus according to the invention, where plastic film is manufactured, slit, stretched, stabilized and placed upon cores for the use intended.
Figure 2:
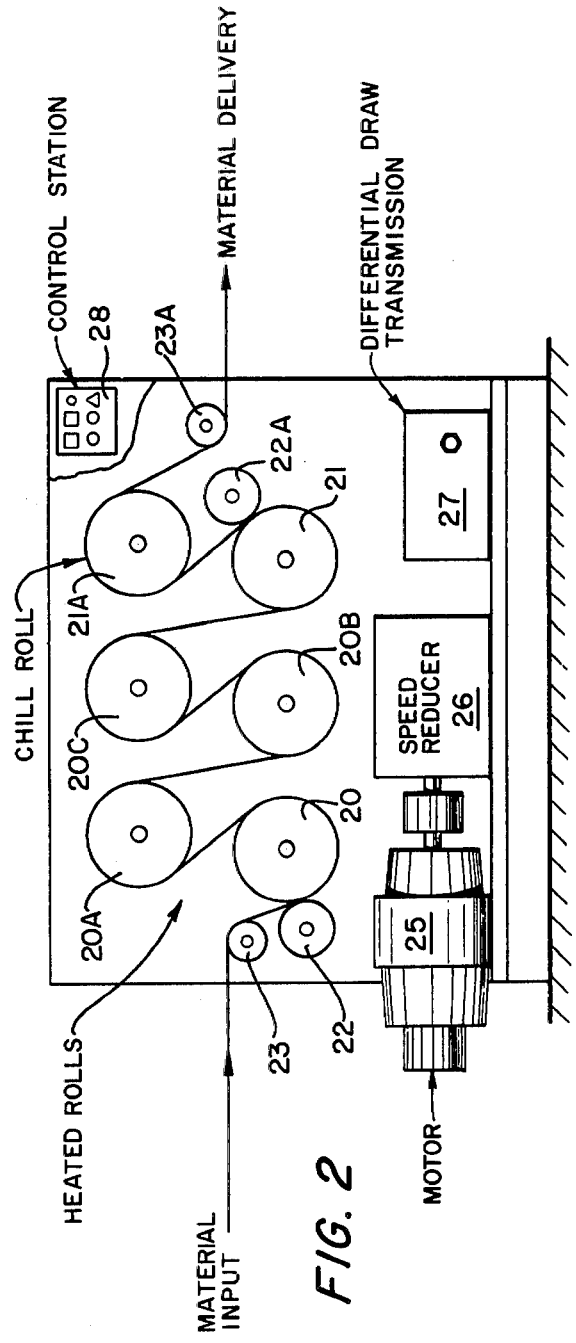
FIG. 2 is a diagrammatic view of the stabilizing apparatus for physical conditioning thermoplastic tape.

Reference numeral 11 denotes an extruder for extruding thermoplastic material. Plastic powder or pellets are supplied to extruder 11 which converts the powder or pellets into a web of plastic material. For purposes of description and not limitation, the plastic web may be 36 inches wide and 20 mills thick. A tank 12 containing water at ambient temperature is placed in-line with the extruder. The plastic web passes from extruder 11 to tank 12 where a quenching or setting operation takes place. The web is then passed to subsequent devices for in-line production. These subsequent devices are a cutting device 13 wherein the plastic web is cut to ribbons or tape, approximately ¼ inch wide, a tensioning device or first godet 14 containing three rollers 15, 15A, 15B, a heat supply means or stretch oven 16, a second tensioning device or second godet 17, containing three rollers 17, 18A, 18B, an annealer 19 containing a plurality of hot and cold surface rollers 20, 21 and nip rollers 22, idler rollers 23 and a winding device 24.

The web of plastic material or film exits from the extruder 11 in a plasticized or heat softened phsyical condition. The water tank 12 quenches the film into a solid physical condition with an inherent molecular arrangement. The film then passes to the cutting device or slitter 13 where the web is cut or slit into a plurality of ribbons or tapes of preselected width. The first godet has the three rollers 15, 15A, 15B all rotating at the same speed: The web is threaded in bridle fashion around said three rollers so as to place a tension on the web of film all the way back to the extruder 11 so that the web is under tension during the passage of the web through the cutting or slitting device 13.

In the second godet 17, the rollers 18, 18A, 18B all rotate at the same speed which is at a greater rate of rotation, or at the same speed of rotation with rollers having a greater circumference, than rollers 15, 15A, 15B thereby, to provide a preselected stretch tension on the web of ribboned film.

The film leaves the stretch oven 16 in heat softened condition. The bridle threading of the film around rollers 18, 18A, 18B, having an ambient temperature surface sets the film but does not stabilize the molecules.

The stretch oven 16 plasticizes or heat softens the film so that a longitudinal stretching operation takes place in heating oven 16. In this manner the ribbons or tapes are reduced to the required thickness, measured in mills.

The essence of the present invention is an annealer 19 provided with idler rollers 23, 23A, nip rollers 22, 22A, heated surface rollers 20, 20A, 20B, 20C and cold surface rollers 21, 21A. Heated surface rollers 20 may be heated by means of hot oil circulating therethrough. Cold surface rollers 21 may be chilled by means of tap water circulating therethrough. A power input or DC motor 25 connected to a speed reducer 26 may be provided to rotate rollers 20, 21 through a differential draw transmission 27. A control station 28 may be attached to the annealer 19.

It will be noted that annealer 19 is provided with two sets of rollers. Heated surface rollers 20, 20A, 20B, 20C in the first set and cold or chilled surface rollers 21, 21A in the second set of rollers. The number of rollers in a set is determined by the degree of heat or chill imparted to the film by conduction. The rollers in each set rotate progressively slower than the preceding adjacent roller.

The film leaving the second godet 17 in set or solid condition must be reheated to be annealed. Annealing is the process wherein the heat softened film having the tension imparted to it during the stretching operation, in the stretch oven 16, is gradually permitted to contract between heated surface rollers 20 due to the memory in the film. In contracting the molecules rearrange themselves in an inherent order. In so doing, an increased or natural tensile strength is imparted to the film. The controlled degree of contraction between rollers 20 controls the shrinkage of the film, which according to the present invention is empirically believed to be less than one percent. Cold surface rollers 21 set or harden the heat softened film in molecular stabilized condition.

Applying conductive heat to the film, in place of radiant heat or heat by convection, provides a deeper penetration of the heat through the film thereby to allow molecular rearrangement of the stretch disoriented molecules.

The initial stretching of the film imparts tensile strength to the film along with building molecular stresses into the film. Annealing prevents shrinkage in the film if the film is again reheated after it leaves annealer 19.

After annealing, the tapes pass to a winder, whereby way of example, the tapes my be individually wound upon separate cores prior to a weaving operation or a wire covering operation.

The conductive heat transfer rates between thermoplastic material in general and in polypropylene, by way of example, and a steel roll is a factor of between five and 10 times greater than heating the film by means of either convection or radiant heating methods. It follows that production of tapes by the present process provides for increased production through increased speed of the tapes through the physical conditioning process outlined herein.

Figure 3:
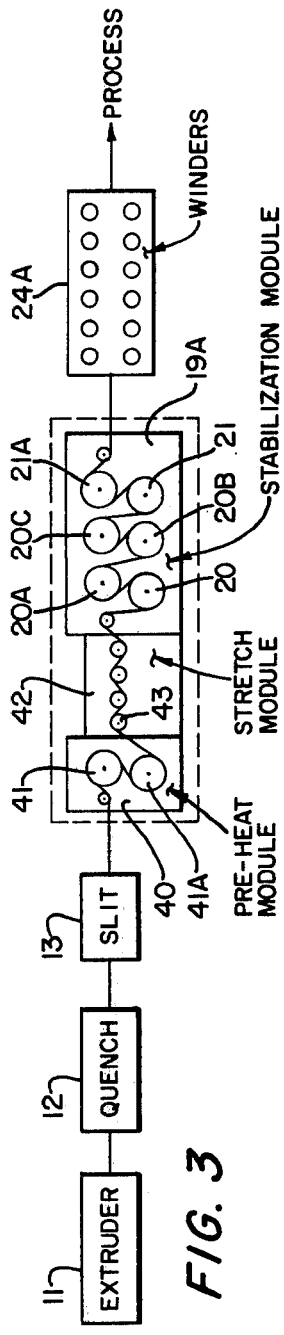
FIG. 3 is a modified form of in-line apparatus where plastic film is manufactured, slit, stretched, stabilized and placed upon core for the use intended.

Reference is now made to FIG. 3, wherein is shown a modified form of in-line production of plastic ribbons or tapes.

Extruder 11, quench tank 12 and slitter 13 may be eliminated and a supply roll of plastic ribbons or tape substituted therefor.

In that event, the supply of plastic tapes passes to subsequent devices. These subsequent devices are a preheat module 40 containing a set of conductive steel heat transfer rollers 41, 41A, a stretch module 42 containing a plurality of rollers 43, an annealer or stabilizing module 19A and a winding device 24A.

The ribboned web passes from a source of supply or slitter 13 to be bridled around heat transfer rollers 41, 41A where through conduction the film is heat softened. The web then passes to, and is bridled around a plurality of stretch rollers 43, and passes to the annealer 19A, in the manner and for the purpose previously described with reference to annealer 19, and passes to winder 24A.

Having shown and described preferred embodiments of the present invention, by way of example, it should be realized that structural changes could be made and other examples given without departing from either the spirit or scope of the present invention.

What I claim is:

1. An apparatus for physically conditioning plastic tape, comprising means for producing a moving web of thermoplastic material, in-line means for cutting said web into a plurality of parallel tapes, in-line means for tensioning said web, said means for tensioning having a set of rollers, a second in-line means for tensioning said web, said second means for tensioning having a set rollers rotating faster than said first set of rollers to provide increased linear speed, said first set of roller and said second set of rollers having a gap therebetween, a stretch oven located in said gap whereby said web is heat softened and stretched in said stretch oven, the improvement comprising an annealer in line following said second set of rollers and having a set of conductive steel heat transfer rollers and a set of conductive steel chill transfer rollers, the heat transfer rollers and the chill transfer rollers all being provided with means for rotating progressively slower than the preceding adjacent roller, to reduce the linear speed between rollers, said set of conductive steel heat transfer rollers reheating said tapes, and relaxing said tapes between the progressively slower rotating adjacent rollers thereby to control the shrinkage of the tapes due to said preheating and to stabilize the tapes against shrinkage.

2. Apparatus for physically conditioning thermoplastic tape, comprising means for supplying a plurality of parallel tapes to a preheat module downstream of said supply means and containing a set of conductive steel heat transfer rolls, said tapes being threaded around said set of conductive steel heat transfer rolls to preheat said tapes to a heat-softened condition, a stretch module downstream of said preheat module and containing a plurality of rollers, and a stabilizing module downstream of said stretch module and containing a set of conductive steel heat transfer rollers followed by a set of conductive steel chill transfer rollers, the heat transfer rollers and the chill transfer rollers having means for imparting to each successive roller a progressively slower linear speed than the preceding adjacent roller, said stretch module longitudinally stretching said tapes and during stretching placing stress in the tapes to disorient the molecular structure of the tapes, said set of conductive steel heat transfer rollers in bridle fashion to reheating said tapes, said set of chill transfer rollers in bridle fashion setting said tapes and to controlling relaxation of the tapes between the progressively slower linear speed of adjacent rollers, thereby to control both shrinkage of the tapes due to reheating, and to stabilize the tapes against further shrinkage due to reheating, and to impart tensile strength to the tapes through reorientation of the molecular structure due to memory activated by releasing the stresses imparted to the tapes during longitudinal stretching.

* * * * *